(12) United States Patent
Kuper et al.

(10) Patent No.: US 10,591,313 B2
(45) Date of Patent: Mar. 17, 2020

(54) DETECTING MOBILE DEVICE SENSOR MALFUNCTIONS

(71) Applicant: Intel Corporation, Santa Clara, CA (US)

(72) Inventors: Lindsey Kuper, Santa Clara, CA (US); Justin E. Gottschlich, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 225 days.

(21) Appl. No.: 15/720,718

(22) Filed: Sep. 29, 2017

(65) Prior Publication Data

US 2019/0101410 A1 Apr. 4, 2019

(51) Int. Cl.
| | | |
|---|---|---|
| *G01D 1/10* | (2006.01) | |
| *G07C 5/00* | (2006.01) | |
| *G01D 3/08* | (2006.01) | |
| *H04W 4/04* | (2009.01) | |
| *H04W 4/70* | (2018.01) | |
| *H04W 4/38* | (2018.01) | |
| *H04W 4/40* | (2018.01) | |

(52) U.S. Cl.
CPC .............. *G01D 1/10* (2013.01); *H04W 4/04* (2013.01); *H04W 4/38* (2018.02); *H04W 4/40* (2018.02); *H04W 4/70* (2018.02); *B60Y 2302/00* (2013.01); *B60Y 2400/30* (2013.01)

(58) Field of Classification Search
CPC .. G01D 1/10; G01D 3/08; G06D 1/00; G06K 9/00; G07C 5/00; G01J 1/04; G01S 7/40; B60S 1/08; B60W 30/18; G06Q 10/06; G06F 21/20
See application file for complete search history.

(56) References Cited

U.S. PATENT DOCUMENTS

2002/0162952 A1* 11/2002 Stuetzler ............. B60R 21/0136
250/227.14
2003/0005747 A1* 1/2003 van der Geest ......... G01D 3/08
73/1.16

(Continued)

OTHER PUBLICATIONS

"Vehicle-Vehicle Communiction", United States Department of Transporation, Accessed on Mar. 22, 2018 http://www.safercar.gov/v2v/index.html, 7 pgs.

(Continued)

*Primary Examiner* — Yuri Kan
(74) *Attorney, Agent, or Firm* — Schwegman Lundberg & Woessner, P.A.

(57) ABSTRACT

Disclosed in some examples are methods, systems, and machine readable mediums for assessing the accuracy of one or more local sensors on a mobile device (such as an AV). In some examples, the accuracy of a local sensor of a first AV may be assessed by periodically comparing sensor readings collected by the local sensor to sensor readings matching selection criteria that are collected by one or more remote sensors located at one or more other nearby AVs. A sensor that reports data that is signifimaytly different from that reported by neighboring AVs is likely to be malfunctioning. The use of nearby sensors in nearby AVs may provide for a method for ensuring the integrity of the AV sensor readings without adding redundant sensors.

23 Claims, 6 Drawing Sheets

(56) References Cited

U.S. PATENT DOCUMENTS

| | | | |
|---|---|---|---|
| 2009/0133122 A1* | 5/2009 | Koo | H04L 63/1416 726/23 |
| 2017/0057510 A1* | 3/2017 | Herbach | B62D 15/025 |
| 2017/0190331 A1* | 7/2017 | Gupta | B60Q 1/346 |
| 2018/0009418 A1* | 1/2018 | Newman | G01S 17/936 |
| 2018/0061148 A1* | 3/2018 | Dudar | B64C 39/024 |
| 2018/0143298 A1* | 5/2018 | Newman | G08G 1/166 |
| 2018/0341891 A1* | 11/2018 | Setchell | G06Q 10/06311 |
| 2018/0357493 A1* | 12/2018 | Takamatsu | G08G 1/096725 |
| 2019/0049958 A1* | 2/2019 | Liu | B60W 30/00 |

OTHER PUBLICATIONS

Junsung, Kim, et al., "SAFER: System-level Architecture for Failure Evasion in Real-time Applications", 10 pgs.

Junsung, Kim, et al., "Towards Dependable Autonomous Driving Vehicles: A System-Level Approach", 4 pgs.

Khalastchi, Eliahu, et al., "Sensor Fault Detection and Diagnosis for Autonomous Systems", Proceedings of the 12th International Conference on Autonomous Agents and Multiagent Systems, (2013), 8 pgs.

Loop, Charles, et al., "Computing Rectifying Homographies for Stereo Vision", Technical Report MSR-TR-99-21 Microsoft Research Proceedings of IEEE Conference on Computer Vision and Pattern Recognition, vol. 1., (Jul. 1999), 14 pgs.

Mills, David L, "Network Time Protocol Version 3", Accessed on Mar. 22, 2018 https://tools.ietf.org/html/rfc1305, (Mar. 1992), 113 pgs.

\* cited by examiner

DETECTING MOBILE DEVICE SENSOR MALFUNCTIONS

TECHNICAL FIELD

Embodiments pertain to mobile devices such as autonomous vehicles (AV)s. Some embodiments relate to detecting sensor malfunctions for mobile devices such as autonomous vehicles.

BACKGROUND

Autonomous vehicles (AV)s feature a variety of sensors such as cameras, accelerometers, lidar, radar, visual cameras, infrared cameras, and more. The data from these sensors provides input to the vehicle's driving algorithms, allowing it to accelerate, brake, navigate and avoid obstacles to safely carry the occupants of the vehicles to their destinations.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
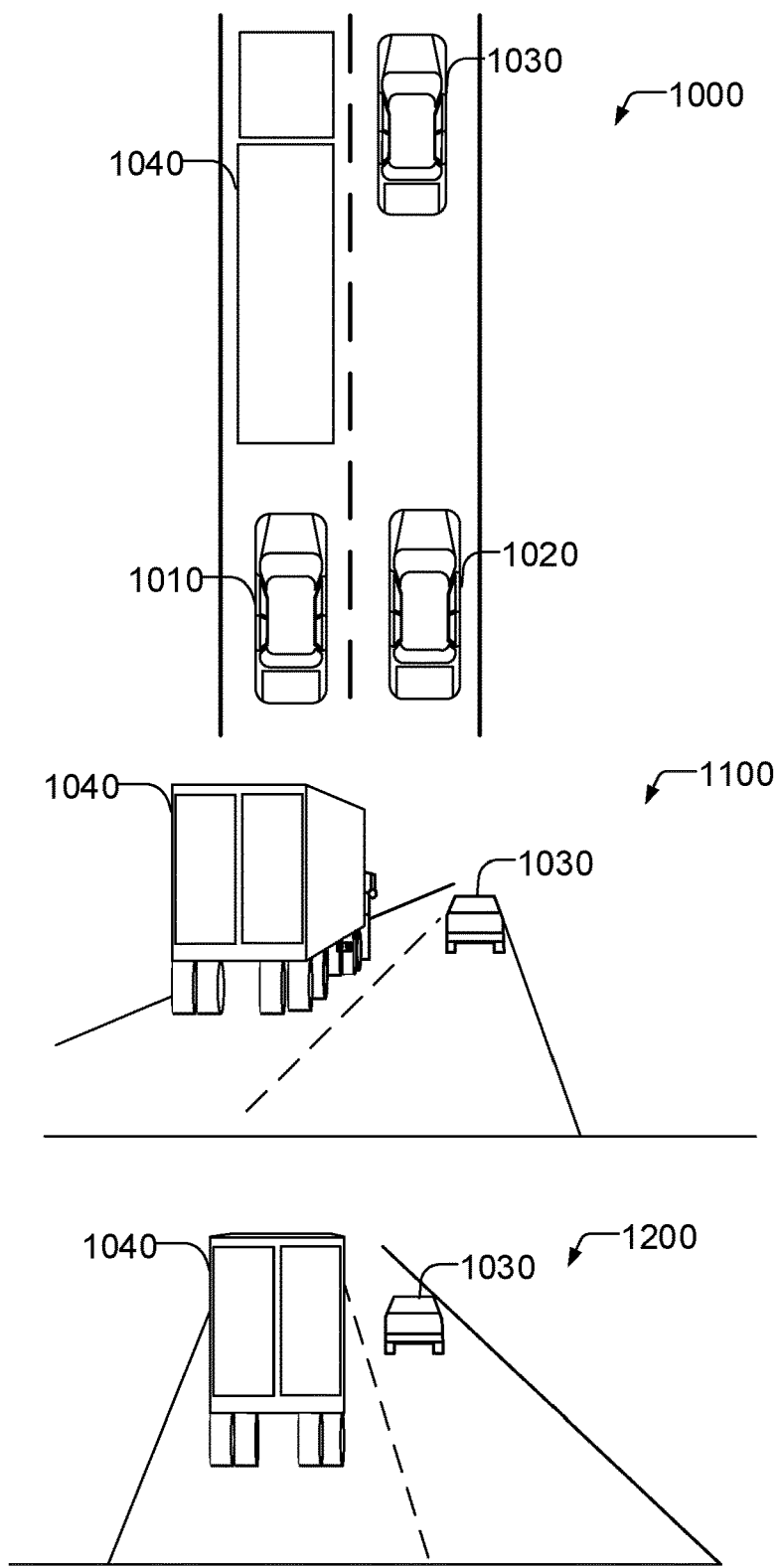
FIG. 1 shows an overhead view of a traffic scenario according to some examples of the present disclosure.

The complex algorithms on AVs that make decisions rely upon accurate sensor data. Unfortunately, sensors on an AV may wear out, be damaged, be obscured, or otherwise produce erroneous results. For example, the lens of a camera might be splashed with mud, obscuring the image. Using erroneous results from a sensor may result in less accurate decisions being made by the driving algorithms of the AV. The AV's self-driving system therefore needs to be able to proactively determine when a sensor is malfunctioning and take corrective actions or at the very least, notify the user. The problem of sensor malfunction detection is complicated by the fact that a malfunctioning sensor may not be able to correctly report on its own accuracy or lack thereof.

One proposed solution is to have sensors provide a "heartbeat" function in which the sensor periodically sends a message or signal to a controller. If the controller fails to receive a heartbeat, the controller may determine that the sensor is malfunctioning. While this method is able to detect failures that prevent the sensor from producing a heartbeat, this solution does not address the problem where the sensor is still providing a heartbeat, but provides inaccurate, corrupted, or otherwise incorrect data. Another proposed solution is to have redundant sensors. This may allow the AV to detect inaccurate, corrupted, or otherwise incorrect data, but is more expensive and increases weight (decreasing gas mileage and performance).

Disclosed in some examples are methods, systems, and machine readable mediums for assessing the accuracy of one or more local sensors on a mobile device (such as an AV). In some examples, the accuracy of a local sensor of a first AV may be assessed by periodically comparing sensor readings collected by the local sensor to sensor readings matching selection criteria that are collected by one or more remote sensors located at one or more other nearby verification devices. Verification devices may be any computing device containing a sensor that is also configured to communicate sensor readings with other devices. Verification devices may include other AVs, other mobile devices (e.g., a smartphone), an infrastructure device, and the like. A sensor that reports data that is significantly different from that reported by neighboring AVs is likely to be malfunctioning. The use of nearby sensors in nearby AVs may provide for a method for ensuring the integrity of the AV sensor readings without adding redundant sensors.

Selection criteria may include one or more of: a location—e.g., that the remote sensor data is within a predetermined geographical radius of the local sensor data, a time criteria—e.g., the remote sensor data was captured at a time that is within a predetermined amount of time that is close to the time the local sensor data was captured, a perspective criteria—e.g., the remote sensor data was captured facing a same direction, and/or the like. In some examples, to synchronize the clocks of AVs, a protocol such as Network Time Protocol may be utilized.

Validity checking may compare one or more sensor readings matching the selection criteria with the sensor data captured by the local sensor. One or more sensor readings may be utilized per neighboring AV. If the number of matches equals or exceeds a determined malfunction detection threshold the sensor may be validated. If the number of matches is less than the determined malfunction detection threshold, the sensor may be labeled as malfunctioning.

The malfunction detection threshold may be one, two, or more remote sensors. In some examples, if the amount of remote sensor readings matching the selection criteria is less than the malfunction detection threshold, the system may lower the malfunction detection threshold, may not check the sensor, or may check the sensor now, wait a predetermined time period, scan for additional remote sensors that may match the selection criteria and then utilize both the previous number of matching sensor readings and the current number of matching sensor readings in determining whether the local sensor is malfunctioning.

In other examples, a ratio may be utilized—that is the number of remote sensors that match the local sensor reading may be divided by the total number of remote sensors matching the selection criteria and this ratio may be compared with the malfunction detection threshold. For example, if the sensor data is an image captured by a camera, and if the malfunction detection threshold is 3/4 that means that at least 3 out of 4 of the remote sensor data collected must match the local sensor data to consider the local sensor data to be valid. If less than 3/4 of the remote sensor data matches the local sensor data, the local sensor may be considered to have malfunctioned.

In some examples, to save on processing power, an AV may first compare the local sensor readings to a single remote sensor reading. A match may end the validity check. A mismatch may trigger processing of additional AV sensor data. In the latter case, one or more additional remote AV sensor readings may be compared with the local sensor reading and the local sensor may be labeled as malfunctioning if the local sensor does not match greater than the malfunction detection threshold number of remote sensor readings.

Malfunctioning sensors may be reported to a controller. The controller may take one or more corrective actions including: notifying a user of the AV, excluding sensor readings from the malfunctioning sensor, weighting sensor readings from the malfunctioning sensor less when used by the AV's driving algorithms, decreasing a time before the next validity check, and the like. Furthermore, once labeled as malfunctioning, a sensor may be monitored periodically, and if the sensor passes the validity checking the sensor may be considered valid again and used as normal.

When comparing the sensor readings, the sensor readings may be adjusted to compensate for different viewpoints or different perspectives from collecting data from a different vantage point (e.g., a different position on the road, a different mounting position, and/or both). For example, for visual camera data, the system may utilize image rectification on photos taken from different perspectives. The image rectification may be based upon the AV's local position and heading relative to the remote AV's position and heading (as provided by the remote AV). If the rectified photos agree within a specified error tolerance, the image sensor may be considered to be functioning properly. As noted, the comparison may have a degree of error. Thus, the remote and local sensor readings may be considered as matching if they are within a threshold level of error. For example, the images may be compared and if they are matching within the threshold level of error, they may be considered as matching. In other examples, a machine learning model may be constructed that is trained using pairs of example matching and non-matching sensor data (such as images) that are labeled as either matching or non-matching. Once constructed, the machine-learning model may take pairs of sensor data (e.g., images) and classify them as matching or not matching. An example machine learning models may include a neural network (including convolutional neural networks).

FIG. 1 shows an overhead view 1000 of a traffic scenario according to some examples of the present disclosure. AVs 1010, 1020, and 1030 are nearby a semi-truck 1040. AV 1020 may have a camera that may capture the view as shown in diagram 1100 with AV 1030 ahead and semi-truck 1040 ahead and to the left (AV 1010 may be in the sensor's blind spot). Likewise, AV 1010 may take an image corresponding to the diagram 1200 with semi-truck 1040 ahead and AV 1030 ahead and to the right. AV 1010 may periodically self-check the output of one or more of its sensors by requesting readings from sensors of a same type from nearby AVs. For example, by communicating using vehicle-to-vehicle protocols such as Wireless Access for Vehicular Environments (WAVE) an AV may request and receive sensor readings from nearby AVs. As previously noted, remote sensor readings may be excluded if it does not meet the selection criteria. As also noted, the remote sensor readings may be adjusted based upon a perspective difference. For example, the image 1100 from AV 1020 may be shifted such that it produces an image such as that shown in 1200. This shift may be based upon the positional differences between AV 1020 and AV 1010 that may be determined through use of positioning data such as Global Positioning System (GPS) data, inertial data, and the like. If the adjusted sensor data of a neighboring AV is sufficiently close (e.g., within an error threshold) to the data provided by the onboard AV sensor data, then the onboard AV sensor data may be classified as functioning normally. If the adjusted sensor data of a neighboring AV is not within the error threshold, then either the neighboring AV sensor or the onboard AV sensor may be malfunctioning.

Figure 2:
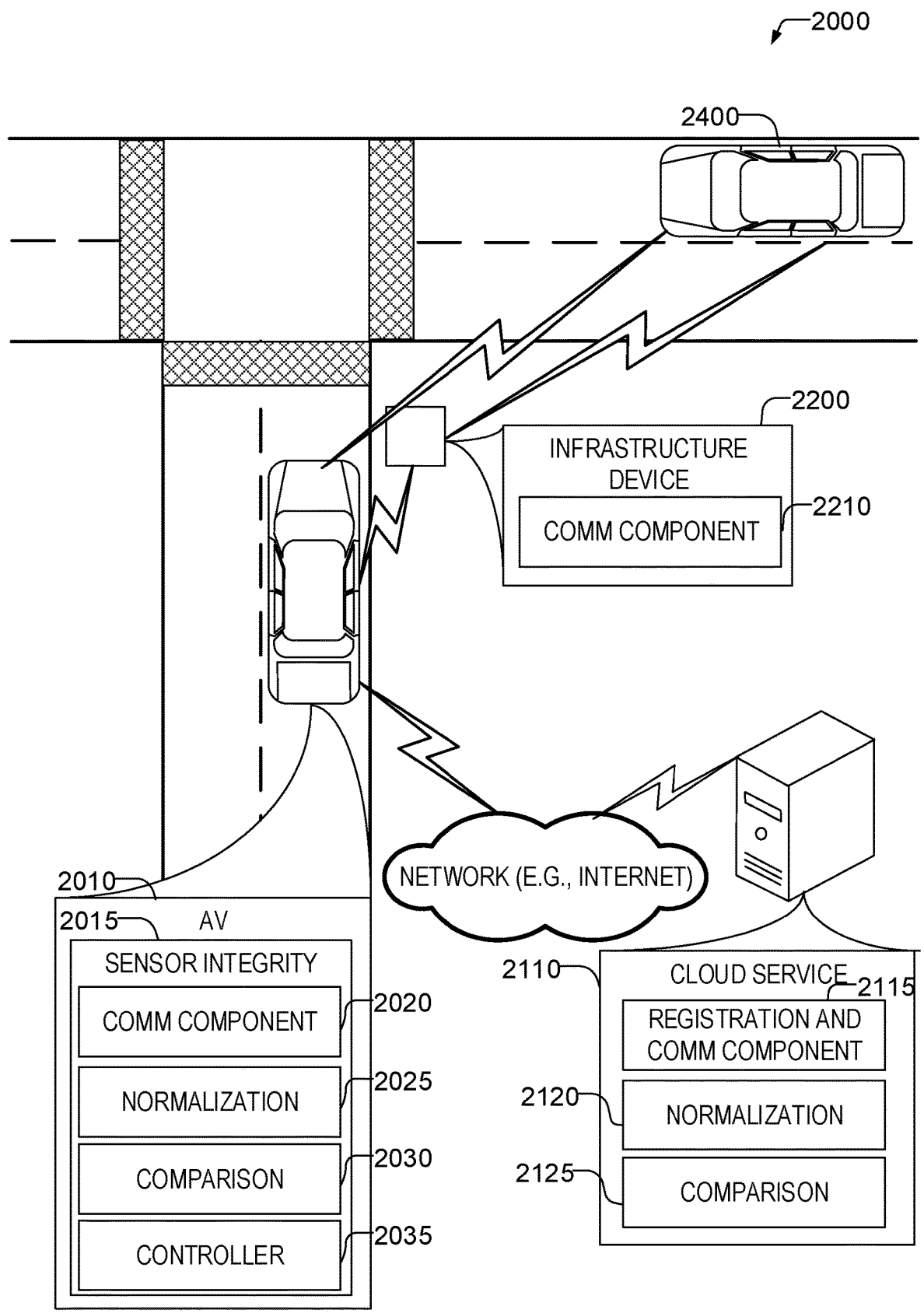
FIG. 2 shows a schematic of an AV sensor verification system according to some examples of the present disclosure.

Turning now to FIG. 2, a schematic 2000 of an AV sensor verification system is shown according to some examples of the present disclosure. AV 2010 may include a sensor integrity component 2015. Sensor integrity component 2015 may include a controller 2035 that may control the sensor integrity check process. Controller 2035 may determine a need for sensor integrity checking. For example, the controller 2035 may verify sensor integrity of one or more local sensors periodically—e.g., the controller 2035 may set a timer that expires after a defined timeout period. In some examples, the timeout period may be the same for each sensor type and in other examples, each sensor type may have a different timeout period. For example, sensors that are more prone to failure may be checked more regularly than those sensors that are more reliable.

Once controller 2035 has determined that an integrity check is desired, it may direct the communications component 2020 to obtain one or more sensor readings from other AVs that are nearby. Communications component 2020 may discover, communicate, and authenticate other AVs. Communications component 2020 may request and receive sensor readings from one or more other AVs. The sensor readings received may include metadata including the location, the time that the sensor reading was captured, and other information that the controller 2035 may utilize to determine whether the remote sensor reading complies with the selection criteria. The sensor data may be rejected if the location is too far from the AV 2010 (e.g., the geolocation provided is outside of a predetermined distance from the AV 2010) or if the data is older than a predetermined threshold, or was taken with a perspective that is too different than that of the perspective of the local sensor data. Communications component 2020 may also query the sensor data from local onboard sensors of the AV 2010 for validity checking. Communication component 2020 may also respond to requests from other AVs for sensor data by providing it.

The normalization component 2025 may transform the received sensor readings from nearby AVs so that those sensor readings would correspond with the same perspective of the sensor readings of the AV 2010. For example, an image reading taken by an AV that is nearby, such as AV 2400 may be shifted so that it mimics what would be obtained from AV 2010. Comparison component 2030 determines whether the received sensor readings are a match to the local sensor readings of the AV 2010. For example, by utilizing comparison algorithms such as Scale Invariant Feature Transform (SIFT), by submitting them to a neural network trained to classify images as matching or not, or the like. In still other examples, the comparison component 2030 may input the sensor data from AV 2010 and nearby AVs into a machine learning model that may output a distance score, and/or an indication of whether the sensor readings match.

Controller 2035 may take one or more actions based upon whether, and/or the number of matching remote AV sensors. For example, as noted, if a single mismatch is detected, action may be taken. In other examples, the number of mismatches must exceed a malfunction detection threshold (which may be one) before an action is taken. Actions may include notifying the user, reducing a weight that the control algorithms of the AV assign the sensor, or the like. In other examples, the AV itself may determine that its sensor data is correct and the remote AV sensor may be malfunctioning. In those examples, the communications component 2020 may notify the remote AV of the error.

In some examples, rather than vehicle-to-vehicle communication, the AV 2010 may obtain nearby sensor readings by utilizing cloud service 2110. For example, registration and communication component 2115 may register AVs, such as AV 2010 and 2400. Registration and communication component 2115 may receive requests for sensor readings, determine nearby AVs and forward the request to nearby AVs. Alternatively, AVs may periodically send sensor readings to the cloud service 2110, which is stored in a database. In these examples, the AV may determine if any of the sensor readings meets the selection criteria (which may be provided by the AV as part of the request), and send any readings meeting that criteria. In some examples, the normalization component 2120, and comparison component 2125 may perform some or all the functions of comparison component 2030 and normalization component 2025. In some examples, by moving these computationally intensive tasks to the cloud service 2110, the AV may see increased performance in other tasks and lower power usage.

As noted, the AV 2010 may utilize remote sensor readings from other AVs, such as AV 2400. In other examples, the AV 2010 may compare the local sensor readings with sensor readings of a sensor of an infrastructure device 2200. Infrastructure device 2200 may be a fixed sensor in a known location that may provide a known-good sensor value that may be utilized by an AV 2010 to perform integrity checking on readings from local sensors in the AV 2010. For example, communications component 2210 of infrastructure device 2200 may discover, communicate, and authenticate with AVs. Communications component 2210 may provide sensor readings from sensors in the infrastructure device 2200 to one or more AVs. AVs may use the sensor readings received from the infrastructure device 2200 the same as data received from other AVs.

Figure 3:
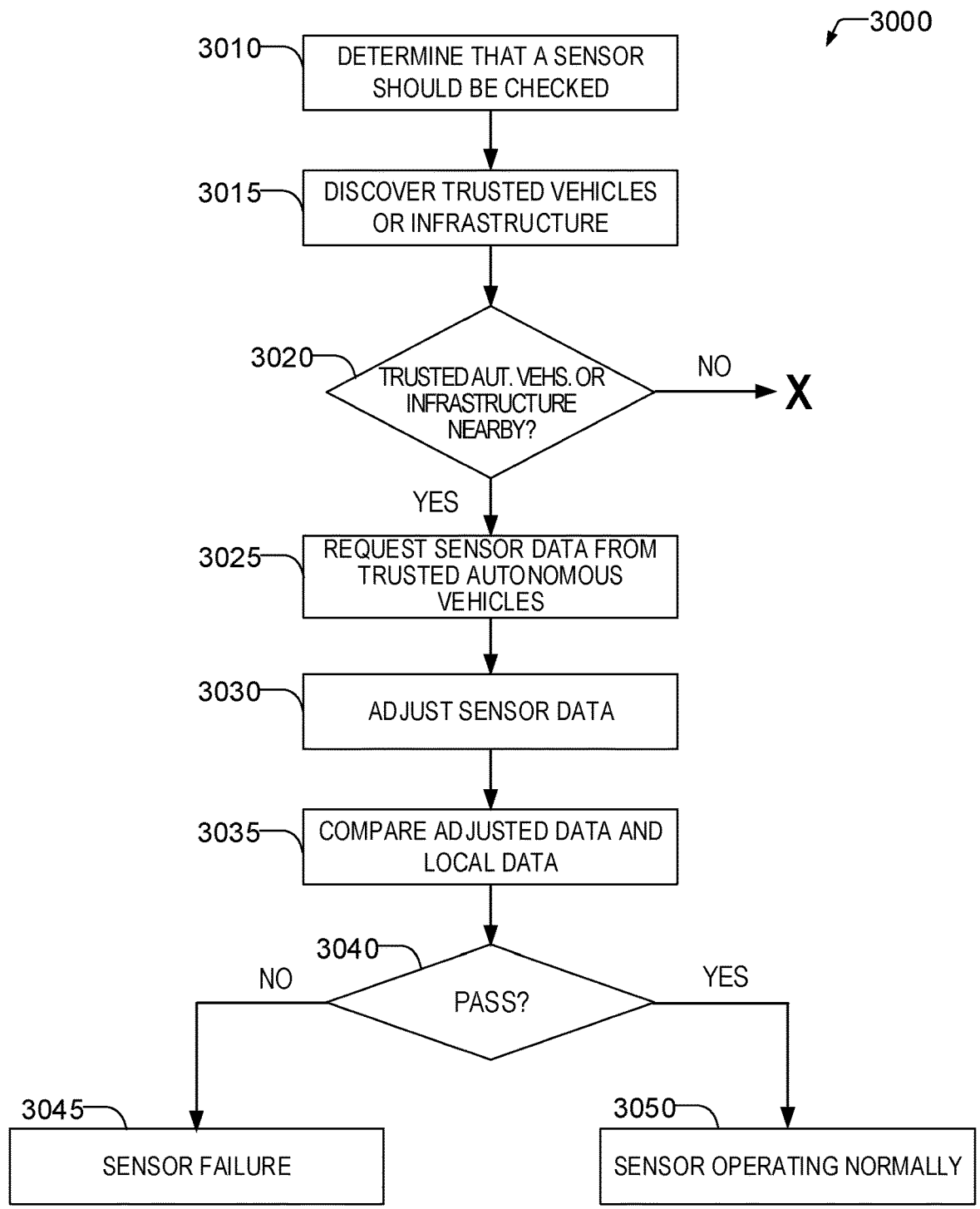
FIG. 3 shows a method of validating a sensor according to some examples of the present disclosure.

FIG. 3 shows a method 3000 of validating a sensor according to some examples of the present disclosure. At operation 3010 the mobile device (e.g., the AV device) may determine that a sensor should be checked to ensure it is functioning properly. Sensors may be checked for a variety of reasons. For example, a specific time interval may have passed, an indication may have been received that the sensor may be producing anomalous readings, and the like. At operation 3015 the device may discover one or more trusted vehicles and/or infrastructure devices and establish secure communications with those devices. At operation 3020 a determination may be made whether there are a sufficient number of trusted AVs or infrastructure devices nearby. In some examples, a sufficient number of trusted AVs or infrastructure devices may be a single trusted AV or infrastructure device. In other examples, a number of AVs or infrastructure devices that is greater than or equal to the malfunction detection threshold may be required. For example, a user or system designer of the AV may want to ensure that the decision of whether or not the sensor is malfunctioning is made based upon a large enough data sample size.

If there are no trusted AVs or infrastructure nearby, or if there are fewer AVs or infrastructure nearby than desired, the process may end. As noted above, in other examples, the operations of 3025, 3030, and 3035 may be performed for AVs discovered in operation 3015 even if there are not enough AVs discovered. The AV may perform the operations of FIG. 3 again at a later time and combine the sensor data discovered at that later time with the sensor readings discovered presently so that the total amount of sensor readings equals or exceeds the malfunction detection threshold.

At operation 3025 a request for remote sensor readings may be made to one or more of those AVs and/or infrastructure devices. At operation 3030, the remote sensor readings may be received and adjusted as previously described. For example, an image taken by a remote sensor (e.g., a digital camera) may be adjusted to match a point of view of the local sensor. For example, an image may be shifted, rotated, zoomed, or other operations. The transformation as well as the magnitude of the transformation may be determined based upon the geolocation and/or perspective data of the AV and/or the remote AVs.

At operation 3035, the local sensor readings may be compared to one or more of the adjusted remote sensor readings. A determination may be made at operation 3040 if the local sensor readings are valid. For example, if the local sensor readings match over a predetermined threshold or ratio of remote sensor readings the sensor may be labeled as valid at operation 3050, otherwise the sensor may be labeled as invalid or failed at operation 3045.

Figure 4:
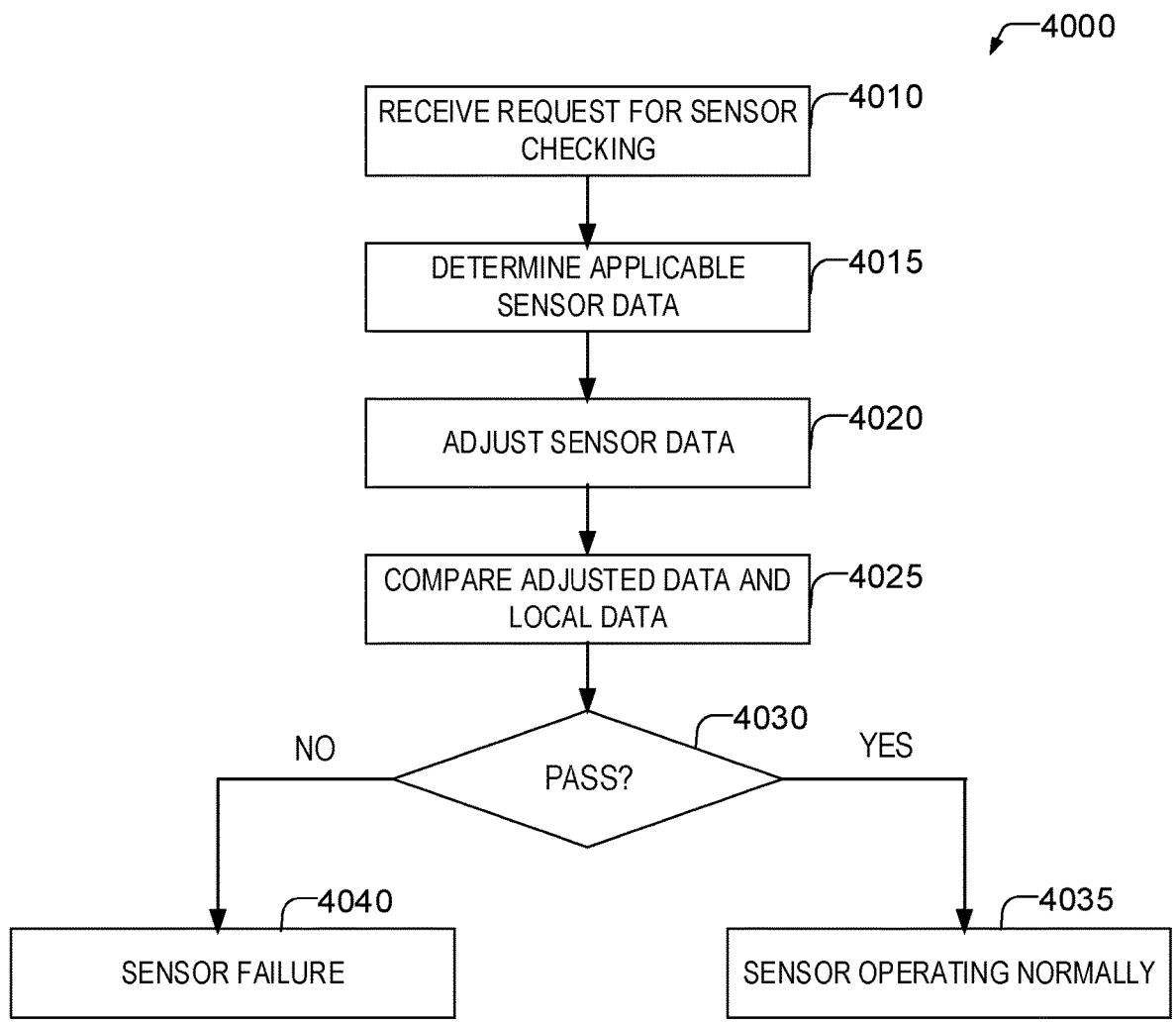
FIG. 4 shows a flowchart of a method of verifying an integrity of a sensor performed by a cloud service according to some examples of the present disclosure.

FIG. 4 shows a flowchart of a method 4000 of verifying an integrity of a sensor performed by a cloud service according to some examples of the present disclosure. At operation 4010 the cloud service may receive a request from a mobile device such as an AV to check a sensor reading. The request may include a geolocation and/or position of the mobile device, the sensor reading, a type of sensor, selection criteria, and/or the like. At operation 4015, the cloud service may detect applicable remote sensor readings. For example, AVs that are registered with the cloud service may send sensor data at regular intervals to the cloud service. These sensor readings, along with when they were captured, and the locations where they were captured may be stored in a database. At operation 4015, the system may determine sensor readings in the database that meet the selection criteria (which may be provided in the request message). In other examples, the AVs that are registered with the cloud service may periodically update their locations. In these examples the cloud service may determine one or more AVs that meet the selection criteria (e.g., are close enough to the requestor) and request sensor readings from those AVs. In still other examples, the cloud service may request that AVs that are registered with the cloud service send the cloud service sensor data when they are within a predetermined distance of specific geolocations. In these examples, AVs may send a sensor reading to the cloud service when they are within the predetermined distance. The cloud service may compare these sensor readings with other AV sensor readings at the same or similar geolocation to determine if the sensor is malfunctioning.

At operation 4020, the sensor data of the requesting AV or the sensor data of the remote sensors in other AVs may be adjusted so that they may be compared. For example, an image may be shifted, rotated, zoomed, or other operations. The transformation as well as the magnitude of the transformation may be determined based upon the geolocation and/or perspective data supplied by both the requesting AV and/or the remote AVs. At operation 4025, the sensor data from the requesting AV may compared with the sensor data from other AVs and/or infrastructure devices. At operation 4030, the system may determine if the local sensor of the requesting AV matches within a predetermined error threshold with a threshold number or ratio of other AV sensor readings. If the requesting AV sensor passes, then at operation 4035 the requesting AV may be notified that the sensor is operating correctly, otherwise, at operation 4040 the requesting AV may be notified that the sensor failed.

Figure 5:
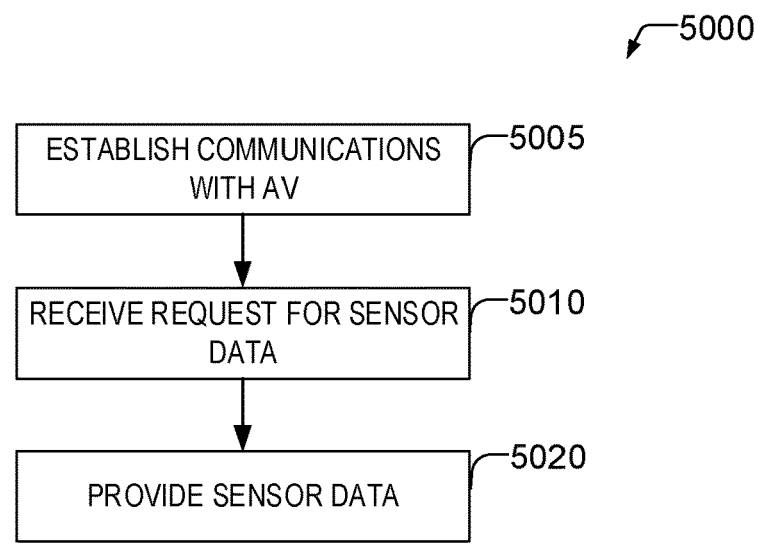
FIG. 5 shows a flowchart of a method of an AV or infrastructure device providing sensor data in response to a request from another AV according to some examples of the present disclosure.

FIG. 5 shows a flowchart of a method 5000 of an AV or infrastructure device providing sensor data in response to a request from another AV according to some examples of the present disclosure. At operation 5005 the AV or infrastructure device may establish a communication session with the AV. At operation 5010 the AV or infrastructure device may receive a request for sensor data from the requesting AV. At operation 5020 the AV or infrastructure device may provide the sensor data to the requesting AV. In some examples, the sensor data may have already been collected. In other examples, the AV or infrastructure may collect the sensor data in response to the request.

While the disclosure herein has been described with reference to a particular kind of mobile device (an AV), one of ordinary skill in the art having the benefit of the present disclosure will appreciate that other types of mobile devices may validate their sensors using the methods, systems, and machine readable mediums disclosed herein. Additionally, in some examples, sensor readings on an AV may be verified by sensor readings on other AVs, mobile devices (e.g., a cell phone), infrastructure devices, and the like. In addition, the apparatus, computing devices, and other structures specified herein may be performed by computing logic such as an FPGA, ASIC, or other type of device. For example, a specialized sensor checking controller. These may be hardware based devices.

Figure 6:
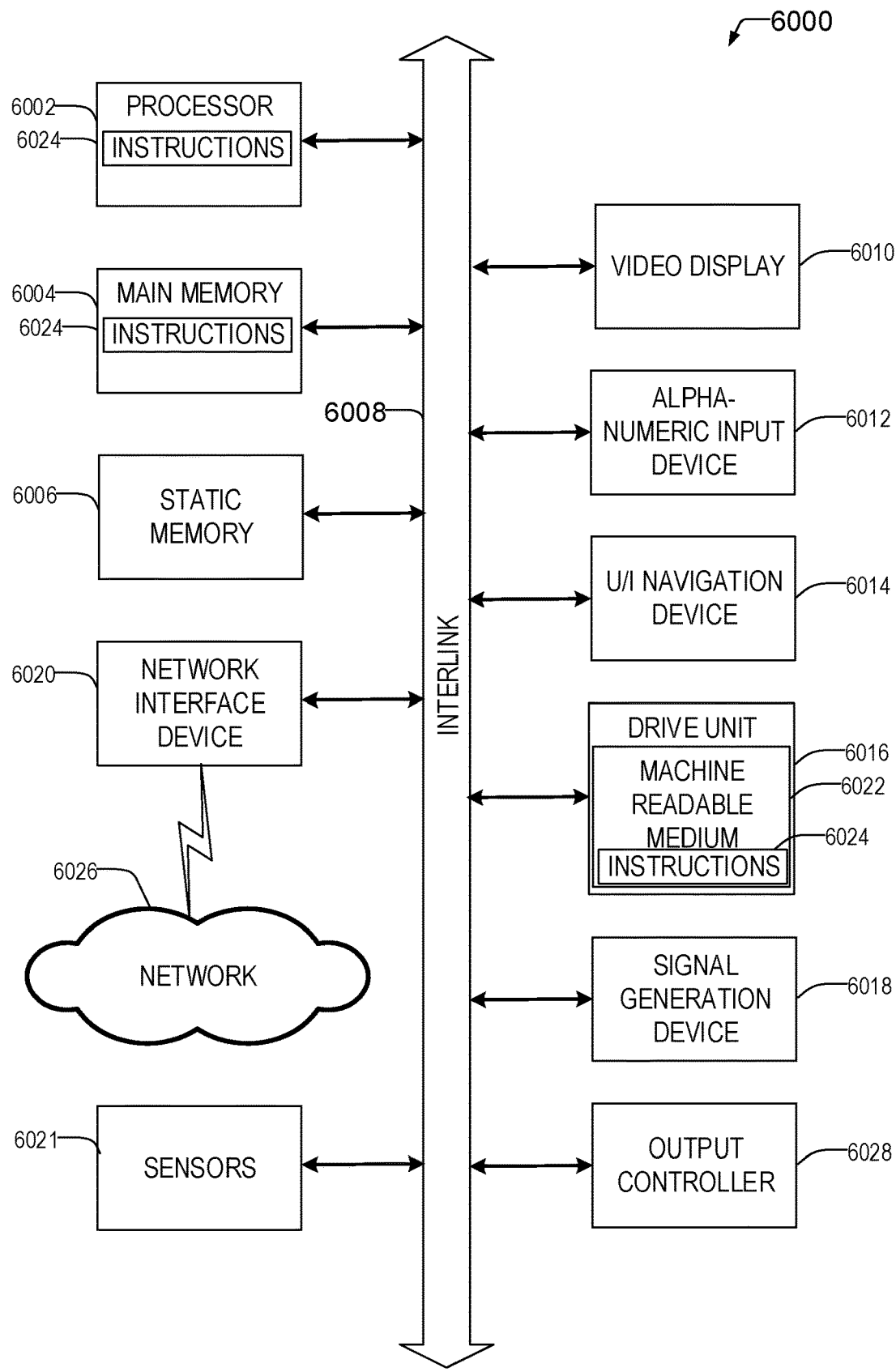
FIG. 6 is a block diagram illustrating an example of a machine upon which one or more embodiments may be implemented.

FIG. 6 illustrates a block diagram of an example machine 6000 upon which any one or more of the techniques (e.g., methodologies) discussed herein may perform. In alternative embodiments, the machine 6000 may operate as a stand-alone device or may be connected (e.g., networked) to other machines. In a networked deployment, the machine 6000 may operate in the capacity of a server machine, a client machine, or both in server-client network environments. In an example, the machine 6000 may act as a peer machine in peer-to-peer (P2P) (or other distributed) network environment. The machine 6000 may be, or be a part of, a AV, an infrastructure device, a cloud service, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, machine 6000 may be or be part of AV 1010, 1020, 1030, 2010, 2400, infrastructure device 2200, and cloud service 2110. Machine 6000 may be configured to implement the methods of FIGS. 3-5. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 6000 may include a hardware processor 6002 (e.g., a central processing unit (CPU), a graphics processing unit (GPU), a hardware processor core, or any combination thereof), a main memory 6004 and a static memory 6006, some or all of which may communicate with each other via an interlink (e.g., bus) 6008. The machine 6000 may further include a display unit 6010, an alphanumeric input device 6012 (e.g., a keyboard), and a user interface (UI) navigation device 6014 (e.g., a mouse). In an example, the display unit 6010, input device 6012 and UI navigation device 6014 may be a touch screen display. The machine 6000 may additionally include a storage device (e.g., drive unit) 6016, a signal generation device 6018 (e.g., a speaker), a network interface device 6020, and one or more sensors 6021, such as a global positioning system (GPS) sensor, compass, accelerometer, or other sensor. The machine 6000 may include an output controller 6028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 6016 may include a machine readable medium 6022 on which is stored one or more sets of data structures or instructions 6024 (e.g., software) embodying or utilized by any one or more of the techniques or functions described herein. The instructions 6024 may also reside, completely or at least partially, within the main memory 6004, within static memory 6006, or within the hardware processor 6002 during execution thereof by the machine 6000. In an example, one or any combination of the hardware processor 6002, the main memory 6004, the static memory 6006, or the storage device 6016 may constitute machine readable media.

While the machine readable medium 6022 is illustrated as a single medium, the term "machine readable medium" may include a single medium or multiple media (e.g., a centralized or distributed database, and/or associated caches and servers) configured to store the one or more instructions 6024.

The term "machine readable medium" may include any medium that is capable of storing, encoding, or carrying instructions for execution by the machine 6000 and that cause the machine 6000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 6024 may further be transmitted or received over a communications network 6026 using a transmission medium via the network interface device 6020. The Machine 6000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 6020 may include one or more physical jacks (e.g., Ethernet, coaxial, or phone jacks) or one or more antennas to connect to the communications network 6026. In an example, the network interface device 6020 may include a plurality of antennas to wirelessly communicate using at least one of single-input multiple-output (SIMO), multiple-input multiple-output (MIMO), or multiple-input single-output (MISO) techniques. In some examples, the network interface device 6020 may wirelessly communicate using Multiple User MIMO techniques.

OTHER NOTES AND EXAMPLES

Example 1 is a computing device comprising: a sensor; a processor; at least one memory device, the memory device storing instructions, that when executed, cause the processor to perform operations comprising: determining that a reading of the sensor is to be checked; discovering a verification device is in a predetermined proximity to the mobile device, the verification device comprising: a second mobile device or an infrastructure device; establishing a communication session with the verification device; requesting a second sensor reading from the verification device; receiving the second sensor reading from the verification device; and determining whether the sensor on the mobile device is malfunctioning based upon a comparison between the second sensor reading from the verification device and a sensor reading from the sensor.

In Example 2, the subject matter of Example 1 includes, wherein the operations of determining that the reading of the sensor is to be checked comprises expiration of a predetermined amount of time.

In Example 3, the subject matter of Example 2 includes, wherein the predetermined amount of time is determined based upon a type of the sensor.

In Example 4, the subject matter of Examples 2-3 includes, wherein the operations further comprise: responsive to determining the sensor on the mobile device is malfunctioning, reducing the predetermined amount of time.

In Example 5, the subject matter of Examples 1-4 includes, wherein the mobile device is an autonomous vehicle.

In Example 6, the subject matter of Examples 1-5 includes, wherein the operations further comprise adjusting the second sensor reading received from the verification device.

In Example 7, the subject matter of Examples 1-6 includes, wherein the operations further comprise: responsive to determining the sensor on the mobile device is malfunctioning, notifying a user of the mobile device.

In Example 8, the subject matter of Examples 1-7 includes, wherein the operations further comprise: responsive to determining the sensor on the mobile device is malfunctioning, modifying a weighting of the sensor in an autonomous vehicle decision making process.

In Example 9, the subject matter of Examples 1-8 includes, wherein the operations of determining whether the sensor on the mobile device is malfunctioning based upon the comparison between the second sensor reading from the verification device and the sensor reading from the sensor comprises: submitting the sensor reading and the second sensor reading to a machine learning algorithm trained to determine whether two sensor readings are matching.

In Example 10, the subject matter of Examples 1-9 includes, wherein the operations of determining whether the sensor on the mobile device is malfunctioning based upon the comparison between the second sensor reading from the verification device and the sensor reading from the sensor comprises: rectifying the second sensor reading to correspond with a position and orientation of the mobile device; and determining whether the sensor on the mobile device is malfunctioning based upon a comparison between the rectified second sensor reading from the verification device and the sensor reading from the sensor.

In Example 11, the subject matter of Examples 1-10 includes, wherein the operations of determining whether the sensor on the mobile device is malfunctioning based upon the comparison between the second sensor reading from the verification device and the sensor reading from the sensor comprises determining that the sensor is malfunctioning as a result of the sensor reading not matching, within a predetermined error threshold, at least a malfunction detection threshold of a plurality of sensor readings from a plurality of mobile devices.

Example 12 is a method for verifying a sensor on a mobile device, the method comprising: determining that a reading of the sensor is to be checked; discovering a verification device is in a predetermined proximity to the mobile device, the verification device comprising: a second mobile device or an infrastructure device; establishing a communication session with the verification device; requesting a second sensor reading from the verification device; receiving the second sensor reading from the verification device; and determining whether the sensor on the mobile device is malfunctioning based upon a comparison between the second sensor reading from the verification device and a sensor reading from the sensor.

In Example 13, the subject matter of Example 12 includes, wherein determining that the reading of the sensor is to be checked comprises expiration of a predetermined amount of time.

In Example 14, the subject matter of Example 13 includes, wherein the predetermined amount of time is determined based upon a type of the sensor.

In Example 15, the subject matter of Examples 13-14 includes, responsive to determining the sensor on the mobile device is malfunctioning, reducing the predetermined amount of time.

In Example 16, the subject matter of Examples 12-15 includes, wherein the mobile device is an autonomous vehicle.

In Example 17, the subject matter of Examples 12-16 includes, adjusting the second sensor reading received from the verification device.

In Example 18, the subject matter of Examples 12-17 includes, responsive to determining the sensor on the mobile device is malfunctioning, notifying a user of the mobile device.

In Example 19, the subject matter of Examples 12-18 includes, responsive to determining the sensor on the mobile device is malfunctioning, modifying a weighting of the sensor in an autonomous vehicle decision making process.

In Example 20, the subject matter of Examples 12-19 includes, wherein determining whether the sensor on the mobile device is malfunctioning based upon the comparison between the second sensor reading from the verification device and the sensor reading from the sensor comprises: submitting the sensor reading and the second sensor reading to a machine learning algorithm trained to determine whether two sensor readings are matching.

In Example 21, the subject matter of Examples 12-20 includes, wherein determining whether the sensor on the mobile device is malfunctioning based upon the comparison between the second sensor reading from the verification device and the sensor reading from the sensor comprises: rectifying the second sensor reading to correspond with a position and orientation of the mobile device; and determining whether the sensor on the mobile device is malfunctioning based upon a comparison between the rectified second sensor reading from the verification device and the sensor reading from the sensor.

In Example 22, the subject matter of Examples 12-21 includes, wherein determining whether the sensor on the mobile device is malfunctioning based upon the comparison between the second sensor reading from the verification device and the sensor reading from the sensor comprises determining that the sensor is malfunctioning as a result of the sensor reading not matching, within a predetermined error threshold, at least a malfunction detection threshold of a plurality of sensor readings from a plurality of mobile devices.

Example 23 is at least one machine-readable medium for verifying a sensor on a mobile device, the machine-readable medium comprising operations, that when executed by a machine, causes the machine to perform operations comprising: determining that a reading of the sensor is to be checked; discovering a verification device is in a predetermined proximity to the mobile device, the verification device comprising: a second mobile device or an infrastructure device; establishing a communication session with the verification device; requesting a second sensor reading from the verification device; receiving the second sensor reading from the verification device; and determining whether the sensor on the mobile device is malfunctioning based upon a comparison between the second sensor reading from the verification device and a sensor reading from the sensor.

In Example 24, the subject matter of Example 23 includes, wherein the operations of determining that the reading of the sensor is to be checked comprises expiration of a predetermined amount of time.

In Example 25, the subject matter of Example 24 includes, wherein the predetermined amount of time is determined based upon a type of the sensor.

In Example 26, the subject matter of Examples 24-25 includes, wherein the operations further comprise: responsive to determining the sensor on the mobile device is malfunctioning, reducing the predetermined amount of time.

In Example 27, the subject matter of Examples 23-26 includes, wherein the mobile device is an autonomous vehicle.

In Example 28, the subject matter of Examples 23-27 includes, wherein the operations further comprise adjusting the second sensor reading received from the verification device.

In Example 29, the subject matter of Examples 23-28 includes, wherein the operations further comprise: responsive to determining the sensor on the mobile device is malfunctioning, notifying a user of the mobile device.

In Example 30, the subject matter of Examples 23-29 includes, wherein the operations further comprise: responsive to determining the sensor on the mobile device is malfunctioning, modifying a weighting of the sensor in an autonomous vehicle decision making process.

In Example 31, the subject matter of Examples 23-30 includes, wherein the operations of determining whether the sensor on the mobile device is malfunctioning based upon the comparison between the second sensor reading from the verification device and the sensor reading from the sensor comprises: submitting the sensor reading and the second sensor reading to a machine learning algorithm trained to determine whether two sensor readings are matching.

In Example 32, the subject matter of Examples 23-31 includes, wherein the operations of determining whether the sensor on the mobile device is malfunctioning based upon the comparison between the second sensor reading from the verification device and the sensor reading from the sensor comprises: rectifying the second sensor reading to correspond with a position and orientation of the mobile device; and determining whether the sensor on the mobile device is malfunctioning based upon a comparison between the rectified second sensor reading from the verification device and the sensor reading from the sensor.

In Example 33, the subject matter of Examples 23-32 includes, wherein the operations of determining whether the sensor on the mobile device is malfunctioning based upon the comparison between the second sensor reading from the verification device and the sensor reading from the sensor comprises determining that the sensor is malfunctioning as a result of the sensor reading not matching, within a predetermined error threshold, at least a malfunction detection threshold of a plurality of sensor readings from a plurality of mobile devices.

Example 34 is a computing device comprising: a sensor; means for determining that a reading of the sensor is to be checked; means for discovering a verification device is in a predetermined proximity to the mobile device, the verification device comprising: a second mobile device or an infrastructure device; means for establishing a communication session with the verification device; means for requesting a second sensor reading from the verification device; means for receiving the second sensor reading from the verification device; and means for determining whether the sensor on the mobile device is malfunctioning based upon a comparison between the second sensor reading from the verification device and a sensor reading from the sensor.

In Example 35, the subject matter of Example 34 includes, wherein the means for determining that the reading of the sensor is to be checked comprises expiration of a predetermined amount of time.

In Example 36, the subject matter of Example 35 includes, wherein the predetermined amount of time is determined based upon a type of the sensor.

In Example 37, the subject matter of Examples 35-36 includes, responsive to determining the sensor on the mobile device is malfunctioning, means for reducing the predetermined amount of time.

In Example 38, the subject matter of Examples 34-37 includes, wherein the mobile device is an autonomous vehicle.

In Example 39, the subject matter of Examples 34-38 includes, means for adjusting the second sensor reading received from the verification device.

In Example 40, the subject matter of Examples 34-39 includes, responsive to determining the sensor on the mobile device is malfunctioning, means for notifying a user of the mobile device.

In Example 41, the subject matter of Examples 34-40 includes, responsive to determining the sensor on the mobile device is malfunctioning, means for modifying a weighting of the sensor in an autonomous vehicle decision making process.

In Example 42, the subject matter of Examples 34-41 includes, wherein determining whether the sensor on the mobile device is malfunctioning based upon the comparison between the second sensor reading from the verification device and the sensor reading from the sensor comprises: means for submitting the sensor reading and the second sensor reading to a machine learning algorithm trained to determine whether two sensor readings are matching.

In Example 43, the subject matter of Examples 34-42 includes, wherein the means for determining whether the sensor on the mobile device is malfunctioning based upon the comparison between the second sensor reading from the verification device and the sensor reading from the sensor comprises: means for rectifying the second sensor reading to correspond with a position and orientation of the mobile device; and means for determining whether the sensor on the mobile device is malfunctioning based upon a comparison between the rectified second sensor reading from the verification device and the sensor reading from the sensor.

In Example 44, the subject matter of Examples 34-43 includes, wherein the means for determining whether the sensor on the mobile device is malfunctioning based upon the comparison between the second sensor reading from the verification device and the sensor reading from the sensor comprises means for determining that the sensor is malfunctioning as a result of the sensor reading not matching, within a predetermined error threshold, at least a malfunction detection threshold of a plurality of sensor readings from a plurality of mobile devices.

Example 45 is a method of providing a cloud service, comprising: receiving, over a network, from a mobile device, a mobile device sensor check request, the request including a sensor reading from a sensor on the mobile device; determining a second sensor reading submitted over the network by a verification device, the verification device comprising a second mobile device or an infrastructure device; determining whether the sensor on the mobile device is malfunctioning based upon a comparison of the sensor reading and the second sensor reading; and communicating whether the sensor on the mobile device is malfunctioning to the mobile device.

In Example 46, the subject matter of Example 45 includes, wherein the mobile device sensor check request includes a location of the mobile device, and wherein determining the second sensor reading comprises selecting the second sensor reading from a plurality of sensor values based upon a proximity of the verification device to the mobile device.

In Example 47, the subject matter of Examples 45-46 includes, periodically receiving sensor reading from a plurality of mobile devices or infrastructure devices.

In Example 48, the subject matter of Examples 45-47 includes, requesting the second sensor reading from the verification device.

In Example 49, the subject matter of Examples 45-48 includes, wherein determining whether the sensor on the mobile device is malfunctioning based upon a comparison of the sensor reading and the second sensor reading comprises submitting the sensor reading and the second sensor reading to a machine learning algorithm trained to determine whether two sensor readings are matching.

In Example 50, the subject matter of Examples 45-49 includes, wherein determining whether the sensor on the mobile device is malfunctioning based upon the comparison between the second sensor reading from the verification device and the sensor reading from the sensor comprises determining that the sensor is malfunctioning as a result of the sensor reading not matching, within a predetermined error threshold, at least a malfunction detection threshold of a plurality of sensor readings from a plurality of mobile devices.

Example 51 is at least one machine-readable medium for providing a cloud service, the machine-readable medium comprising instructions, that when executed by a machine, causes the machine to perform operations comprising: receiving, over a network, from a mobile device, a mobile device sensor check request, the request including a sensor reading from a sensor on the mobile device; determining a second sensor reading submitted over the network by a verification device, the verification device comprising a second mobile device or an infrastructure device; determining whether the sensor on the mobile device is malfunctioning based upon a comparison of the sensor reading and the second sensor reading; and communicating whether the sensor on the mobile device is malfunctioning to the mobile device.

In Example 52, the subject matter of Example 51 includes, wherein the mobile device sensor check request includes a location of the mobile device, and wherein the operations of determining the second sensor reading comprises selecting the second sensor reading from a plurality of sensor values based upon a proximity of the verification device to the mobile device.

In Example 53, the subject matter of Examples 51-52 includes, wherein the operations further comprise: periodically receiving sensor reading from a plurality of mobile devices or infrastructure devices.

In Example 54, the subject matter of Examples 51-53 includes, wherein the operations further comprise: requesting the second sensor reading from the verification device.

In Example 55, the subject matter of Examples 51-54 includes, wherein the operations of determining whether the sensor on the mobile device is malfunctioning based upon a comparison of the sensor reading and the second sensor reading comprises submitting the sensor reading and the second sensor reading to a machine learning algorithm trained to determine whether two sensor readings are matching.

In Example 56, the subject matter of Examples 51-55 includes, wherein the operations of determining whether the sensor on the mobile device is malfunctioning based upon the comparison between the second sensor reading from the verification device and the sensor reading from the sensor comprises determining that the sensor is malfunctioning as a result of the sensor reading not matching, within a predetermined error threshold, at least a malfunction detection threshold of a plurality of sensor readings from a plurality of mobile devices.

Example 57 is a computing device comprising: a processor; at least one memory, the memory comprising instructions, that when executed by the processor, causes the processor to perform operations comprising: receiving, over a network, from a mobile device, a mobile device sensor check request, the request including a sensor reading from a sensor on the mobile device; determining a second sensor reading submitted over the network by a verification device, the verification device comprising a second mobile device or an infrastructure device; determining whether the sensor on the mobile device is malfunctioning based upon a comparison of the sensor reading and the second sensor reading; and communicating whether the sensor on the mobile device is malfunctioning to the mobile device.

In Example 58, the subject matter of Example 57 includes, wherein the mobile device sensor check request includes a location of the mobile device, and wherein the operations of determining the second sensor reading comprises selecting the second sensor reading from a plurality of sensor values based upon a proximity of the verification device to the mobile device.

In Example 59, the subject matter of Examples 57-58 includes, wherein the operations further comprise: periodically receiving sensor reading from a plurality of mobile devices or infrastructure devices.

In Example 60, the subject matter of Examples 57-59 includes, wherein the operations further comprise: requesting the second sensor reading from the verification device.

In Example 61, the subject matter of Examples 57-60 includes, wherein the operations of determining whether the sensor on the mobile device is malfunctioning based upon a comparison of the sensor reading and the second sensor reading comprises submitting the sensor reading and the second sensor reading to a machine learning algorithm trained to determine whether two sensor readings are matching.

In Example 62, the subject matter of Examples 57-61 includes, wherein the operations of determining whether the sensor on the mobile device is malfunctioning based upon the comparison between the second sensor reading from the verification device and the sensor reading from the sensor comprises determining that the sensor is malfunctioning as a result of the sensor reading not matching, within a predetermined error threshold, at least a malfunction detection threshold of a plurality of sensor readings from a plurality of mobile devices.

Example 63 is a computing device, comprising: means for receiving, over a network, from a mobile device, a mobile device sensor check request, the request including a sensor reading from a sensor on the mobile device; means for determining a second sensor reading submitted over the network by a verification device, the verification device comprising a second mobile device or an infrastructure device; means for determining whether the sensor on the mobile device is malfunctioning based upon a comparison of the sensor reading and the second sensor reading; and means for communicating whether the sensor on the mobile device is malfunctioning to the mobile device.

In Example 64, the subject matter of Example 63 includes, wherein the mobile device sensor check request includes a location of the mobile device, and wherein the means for determining the second sensor reading comprises means for selecting the second sensor reading from a plurality of sensor values based upon a proximity of the verification device to the mobile device.

In Example 65, the subject matter of Examples 63-64 includes, means for periodically receiving sensor reading from a plurality of mobile devices or infrastructure devices.

In Example 66, the subject matter of Examples 63-65 includes, means for requesting the second sensor reading from the verification device.

In Example 67, the subject matter of Examples 63-66 includes, wherein the means for determining whether the sensor on the mobile device is malfunctioning based upon a comparison of the sensor reading and the second sensor reading comprises means for submitting the sensor reading and the second sensor reading to a machine learning algorithm trained to determine whether two sensor readings are matching.

In Example 68, the subject matter of Examples 63-67 includes, wherein the means for determining whether the sensor on the mobile device is malfunctioning based upon the comparison between the second sensor reading from the verification device and the sensor reading from the sensor comprises means for determining that the sensor is malfunctioning as a result of the sensor reading not matching, within a predetermined error threshold, at least a malfunction detection threshold of a plurality of sensor readings from a plurality of mobile devices.

Example 69 is an apparatus, comprising: sensor fault checking controller logic, at least partially hardware implemented, to at least: determine that a reading of a sensor is to be checked; discover a verification device is in a predetermined proximity to the mobile device, the verification device comprising: a second mobile device or an infrastructure device; establish a communication session with the verification device; request a second sensor reading from the verification device; receive the second sensor reading from the verification device; and determine whether the sensor on the mobile device is malfunctioning based upon a comparison between the second sensor reading from the verification device and a sensor reading from the sensor.

In Example 70, the subject matter of Example 69 includes, wherein the fault checking controller logic is to determine that the reading of the sensor is to be checked by at least determining that an expiration of a predetermined amount of time has occurred.

In Example 71, the subject matter of Example 70 includes, wherein the predetermined amount of time is determined based upon a type of the sensor.

In Example 72, the subject matter of Examples 70-71 includes, wherein the fault checking controller logic is to further: reduce the predetermined amount of time in response to a determination that the sensor on the mobile device is malfunctioning,.

In Example 73, the subject matter of Examples 69-72 includes, wherein the mobile device is an autonomous vehicle.

In Example 74, the subject matter of Examples 69-73 includes, wherein the fault checking controller logic is to further: adjust the second sensor reading received from the verification device.

In Example 75, the subject matter of Examples 69-74 includes, wherein the fault checking controller logic is to further: notify a user of the mobile device responsive to the determination that the sensor on the mobile device is malfunctioning.

In Example 76, the subject matter of Examples 69-75 includes, wherein the fault checking controller logic is to further: modify a weighting of the sensor in an autonomous vehicle decision making process responsive to a determination that the sensor on the mobile device is malfunctioning.

In Example 77, the subject matter of Examples 69-76 includes, wherein the fault checking controller logic is to determine whether the sensor on the mobile device is malfunctioning based upon the comparison between the second sensor reading from the verification device and the sensor reading from the sensor by at least: submitting the sensor reading and the second sensor reading to a machine learning algorithm trained to determine whether two sensor readings are matching.

In Example 78, the subject matter of Examples 69-77 includes, wherein the fault checking controller logic is to determine whether the sensor on the mobile device is malfunctioning based upon the comparison between the second sensor reading from the verification device and the sensor reading from the sensor by at least: rectifying the second sensor reading to correspond with a position and orientation of the mobile device; and determining whether the sensor on the mobile device is malfunctioning based upon a comparison between the rectified second sensor reading from the verification device and the sensor reading from the sensor.

In Example 79, the subject matter of Examples 69-78 includes, wherein the fault checking controller logic is determine whether the sensor on the mobile device is malfunctioning based upon the comparison between the second sensor reading from the verification device and the sensor reading from the sensor by at least determining that the sensor is malfunctioning as a result of the sensor reading not matching, within a predetermined error threshold, at least a malfunction detection threshold of a plurality of sensor readings from a plurality of mobile devices.

Example 80 is at least one machine-readable medium including instructions that, when executed by processing circuitry, cause the processing circuitry to perform operations to implement of any of Examples 1-79.

Example 81 is an apparatus comprising means to implement of any of Examples 1-79.

Example 82 is a system to implement of any of Examples 1-79.

Example 83 is a method to implement of any of Examples 1-79.

What is claimed is:

1. A computing device for detecting sensor malfunctions, comprising:
   a sensor;
   a processor;
   at least one memory device, the memory device storing instructions, that when executed, cause the processor to perform operations comprising:
   determining that a reading of the sensor is to be checked;
   responsive to determining that the reading of the sensor is to be checked, discovering a verification device is in a predetermined proximity to the computing device, the verification device comprising a second computing device or an infrastructure device;
   establishing a communication session with the verification device;
   requesting a second sensor reading from the verification device;
   receiving the second sensor reading from the verification device;
   determining whether the second sensor reading from the verification device and the sensor reading from the sensor differs by less than a threshold level of error;
   responsive to determining that the sensor reading on the computing device and the second sensor reading differ greater than a threshold level of error, establishing a connection with one or more other verification devices that are in the predetermined proximity to the computing device;
   establishing communication sessions with the one or more other verification devices;
   requesting sensor readings from the one or more other verification devices;
   receiving the sensor readings from the one or more other verification devices; and
   determining that the sensor is malfunctioning based upon a determination that a threshold number of the sensor readings from the one or more other verification devices differ from the sensor reading by greater than the threshold level of error.

2. The computing device of claim 1, wherein the operations of determining that the reading of the sensor is to be checked comprises expiration of a predetermined amount of time.

3. The computing device of claim 2, wherein the predetermined amount of time is determined based upon a type of the sensor.

4. The computing device of claim 2, wherein the operations further comprise:
   responsive to determining the sensor on the computing device is malfunctioning, reducing the predetermined amount of time.

5. The computing device of claim 1, wherein the computing device is an autonomous vehicle.

6. The computing device of claim 1, wherein the operations further comprise adjusting the second sensor reading received from the verification device.

7. The computing device of claim 1, wherein the operations further comprise:
   responsive to determining the sensor on the computing device is malfunctioning, notifying a user of the computing device.

8. The computing device of claim 1, wherein the operations further comprise:
   responsive to determining the sensor on the computing device is malfunctioning, modifying a weighting of the sensor in an autonomous vehicle decision making process.

9. The computing device of claim 1, wherein the operations of determining whether the second sensor reading from the verification device and the sensor reading from the sensor differs less than the threshold level of error comprises:
   rectifying the second sensor reading to correspond with a position and orientation of the computing device.

10. A method for verifying a sensor on a mobile device, the method comprising:
- determining that a reading of the sensor is to be checked;
- responsive to determining that the reading of the sensor is to be checked, discovering a verification device is in a predetermined proximity to the mobile device, the verification device comprising a second mobile device or an infrastructure device;
- establishing a communication session with the verification device;
- requesting a second sensor reading from the verification device;
- receiving the second sensor reading from the verification device;
- determining whether the second sensor reading from the verification device and the sensor reading from the sensor differs by less than a threshold level of error;
- responsive to determining that the sensor on the mobile device and the second sensor reading differ greater than a threshold level of error, establishing a connection with one or more other verification devices that are in the predetermined proximity to the mobile device;
- establishing communication sessions with the one or more other verification devices;
- requesting sensor readings from the one or more other verification devices;
- receiving the sensor readings from the one or more other verification devices; and
- determining that the sensor is malfunctioning based upon a determination that a threshold number of the sensor readings from the one or more other verification devices differ from the sensor reading by greater than the threshold level of error.

11. The method of claim 10, wherein determining that the reading of the sensor is to be checked comprises expiration of a predetermined amount of time.

12. The method of claim 11, wherein the predetermined amount of time is determined based upon a type of the sensor.

13. The method of claim 11, further comprising:
- responsive to determining the sensor on the mobile device is malfunctioning, reducing the predetermined amount of time.

14. At least one non-transitory machine-readable medium for verifying a sensor on a mobile device, the machine-readable medium comprising operations, that when executed by a machine, causes the machine to perform operations comprising:
- determining that a reading of the sensor is to be checked;
- responsive to determining that the reading of the sensor is to be checked, discovering a verification device is in a predetermined proximity to the mobile device, the verification device comprising a second mobile device or an infrastructure device;
- establishing a communication session with the verification device;
- requesting a second sensor reading from the verification device;
- receiving the second sensor reading from the verification device; and
- determining whether the second sensor reading from the verification device and the sensor reading from the sensor differs less than a threshold level of error;
- responsive to determining that the sensor on the mobile device and the second sensor reading differ greater than a threshold level of error, establishing a connection with one or more other verification devices that are in the predetermined proximity to the mobile device;
- establishing communication sessions with the one or more other verification devices;
- requesting sensor readings from the one or more other verification devices;
- receiving the sensor readings from the one or more other verification devices; and
- determining that the sensor is malfunctioning based upon a determination that a threshold number of the sensor readings from the one or more other verification devices differ from the sensor reading by greater than the threshold level of error.

15. The machine-readable medium of claim 14, wherein the operations of determining that the reading of the sensor is to be checked comprises expiration of a predetermined amount of time.

16. The machine-readable medium of claim 15, wherein the predetermined amount of time is determined based upon a type of the sensor.

17. The machine-readable medium of claim 15, wherein the operations further comprise:
- responsive to determining the sensor on the mobile device is malfunctioning, reducing the predetermined amount of time.

18. The machine-readable medium of claim 14, wherein the mobile device is an autonomous vehicle.

19. An apparatus for detecting sensor malfunctions, comprising:
- a sensor fault checking controller implemented by a processor and configured to:
- determine that a reading of a sensor is to be checked;
- responsive to determining that the reading of the sensor is to be checked, discover a verification device is in a predetermined proximity to a mobile device, the verification device comprising a second mobile device or an infrastructure device;
- establish a communication session with the verification device;
- request a second sensor reading from the verification device;
- receive the second sensor reading from the verification device;
- determining whether the second sensor reading from the verification device and a sensor reading from the sensor differs by less than a threshold level of error;
- responsive to determining that the sensor on the mobile device and the second sensor reading differ greater than a threshold level of error, establishing a connection with one or more other verification devices that are in the predetermined proximity to the mobile device;
- establishing communication sessions with the one or more other verification devices;
- requesting sensor readings from the one or more other verification devices;
- receiving the sensor readings from the one or more other verification devices; and
- determining that the sensor is malfunctioning based upon a determination that a threshold number of the sensor readings from the one or more other verification devices differ from the sensor reading by greater than the threshold level of error.

20. The apparatus of claim 19, wherein the sensor fault checking controller is configured to determine that the reading of the sensor is to be checked by at least determining that an expiration of a predetermined amount of time has occurred.

21. The apparatus of claim 20, wherein the predetermined amount of time is determined based upon a type of the sensor.

22. The apparatus of claim 20, wherein the fault checking controller is configured to reduce the predetermined amount of time in response to a determination that the sensor on the mobile device is malfunctioning.

23. The apparatus of claim 19, wherein the mobile device is an autonomous vehicle.

* * * * *